US005663516A

United States Patent [19]

Kawashima

[11] Patent Number: 5,663,516

[45] Date of Patent: Sep. 2, 1997

[54] KARAOKE APPARATUS HAVING PHYSICAL MODEL SOUND SOURCE DRIVEN BY SONG DATA

[75] Inventor: Takahiro Kawashima, Hamamatsu, Japan

[73] Assignee: Yamaha Corporation, Hamamatsu, Japan

[21] Appl. No.: 659,262

[22] Filed: Jun. 6, 1996

[30] Foreign Application Priority Data

Jun. 13, 1995 [JP] Japan .................................... 7-146478

[51] Int. Cl.[6] ................................ G09B 5/00; G10H 1/36

[52] U.S. Cl. ............................ 84/610; 84/634; 434/307 A

[58] Field of Search ..................... 84/601, 602, 609–614, 84/634–638; 434/307 A

[56] References Cited

U.S. PATENT DOCUMENTS 5,220,117 6/1993 Yamada et al. .
5,371,317 12/1994 Masuda .

*Primary Examiner*—Stanley J. Witkowski
*Attorney, Agent, or Firm*—Loeb & Loeb LLP

[57] ABSTRACT

In a karaoke apparatus responsive to a request for producing a karaoke accompaniment according to performance data, a sound source of a physical model type is controlled according to shape data which characterizes an acoustic vibration of a model musical instrument for electrically simulating the acoustic vibration to synthesize a tone waveform as if created by the model musical instrument, and is driven according to performance data for sequentially processing the tone waveform to produce the karaoke accompaniment. A distributor is settable with the shape data for feeding the sound source with the set physical data. A memory stores a plurality of items of performance data and a plurality of types of shape data in correspondence with each other. A driver is responsive to the request for retrieving from the memory a requested item of the performance data to sequentially feed the same to the sound source to thereby commence the karaoke accompaniment, and operates before the karaoke accompaniment is commenced for retrieving from the memory a corresponding type of the shape data to set the same into the distributor so that the sound source can be fed with a pair of the requested item of the performance data and the corresponding type of the shape data. A downloader downloads new types of the shape data into the memory to update a file containing a plurality of old types of the shape data.

7 Claims, 9 Drawing Sheets

KARAOKE APPARATUS HAVING PHYSICAL MODEL SOUND SOURCE DRIVEN BY SONG DATA

BACKGROUND OF THE INVENTION

The present invention relates to a karaoke apparatus, in which timbres of a karaoke accompaniment can be easily modified, and timbre kinds can be updated through on-line data downloading.

In the prior art, a sound source karaoke apparatus performs a karaoke accompaniment by driving an internal sound source device according to song data. The song data has a sequential format in which a timbre, a pitch and a volume of musical sound are prescribed in time series. The karaoke sound is reproduced by driving the sound source device according to the song data. The sound source device employed in the conventional karaoke apparatus is typically a PCM sound source. In the PCM sound source device, a waveform of a natural musical instrument is digitally sampled and prestored in the form of PCM data. The prestored PCM data is read out in response to a request in order to reproduce the waveform of the musical sound. In the PCM sound source device, a memory capacity in the order of 700 kbits is required to store one second length of the PCM sampling data in a CD (Compact Disc) quality (44.1 kHz). The whole sampling data has a total length in the order of several seconds so that several megabits of data size are required for the whole PCM data. Further in the PCM sound source device, the PCM sampling data could not be stored in economic rewriteable storage devices such as disk memory devices, but the PCM sampling data should be stored in a specific memory device such as a ROM which can be accessed at high speed, since the sampling data should be read out in real-time to reproduce the waveform of the musical sound. For this reason, the PCM sound source device included in the karaoke apparatus employs the ROM for storing the sampling data, so that the timbre of the karaoke sound cannot be modified. The conventional karaoke apparatus prestores a plurality of waveforms representative of various timbre items. However, the number of the timbre items are limited, and the registered timbres are all typical ones to match with any of karaoke songs. In order to remedy these limitations, the conventional karaoke apparatus utilizes an effector having filtering function and being connected to the sound source device. The effector modifies a frequency spectrum of the waveform to impart variation to an original timbre of the typical waveform. However, the basic waveform is fixed so that a drastic variation of the timbre is not realized.

SUMMARY OF THE INVENTION

The purpose of the present invention is to provide a karaoke apparatus which can reproduce various timbres with a small data capacity, and in which timbre items can be updated freely even after installation of the karaoke apparatus.

According to a first aspect of the invention, in a karaoke apparatus responsive to a request for producing a karaoke accompaniment according to performance data, a sound source of a physical model type is controlled according to shape data which characterizes an acoustic vibration of a model musical instrument for electrically simulating the acoustic vibration to synthesize a tone waveform as if created by the model musical instrument, and is driven according to performance data for sequentially processing the tone waveform to produce the karaoke accompaniment.

A distributor is settable with the shape data for feeding the sound source with the set physical data. A memory stores a plurality of items of performance data and a plurality of types of shape data in correspondence with each other. A driver is responsive to the request for retrieving from the memory a requested item of the performance data to sequentially feed the same to the sound source to thereby commence the karaoke accompaniment, and operates before the karaoke accompaniment is commenced for retrieving from the memory a corresponding type of the shape data to set the same into the distributor so that the sound source can be fed with a pair of the requested item of the performance data and the corresponding type of the shape data.

According to a second aspect of the invention, in a karaoke apparatus responsive to a request for producing a karaoke accompaniment according to performance data, a sound source of a physical model type is controlled according to shape data which characterizes an acoustic vibration of a model musical instrument for electrically simulating the acoustic vibration to synthesize a tone waveform as if created by the model musical instrument, and is driven according to the performance data for sequentially processing the tone waveform to produce the karaoke accompaniment. A memory rewriteably stores a file of a plurality of the shape data. A downloader downloads new ones of the shape data into the memory so as to update the file. A distributor retrieves a desired one of the shape data from the updated file in matching with the performance data, and feeds the retrieved one of the shape data to the sound source to thereby control the same.

In operation of the first aspect of the invention, the physical model sound source generates the waveform of musical sounds by electrically simulating the vibration of air in a natural musical instrument according to the shape data. The shape data represents acoustic characteristics such as a physical shape of the natural musical instrument, and is composed of shape parameters representing a physical dimension such as size and length, and tables representing relationship between a stress and an input load. The physical model sound source is driven by the performance data included in composite karaoke song data. The performance data has a sequence format to synthesize the karaoke accompaniment sound. The shape data is stored in association with the performance data in the song data memory. At the start of the karaoke accompaniment, the shape data relevant to the song data is distributed to the physical model sound source. Thus, an optimum type of the shape data for the performance data can be distributed to the physical model sound source. Thus, it is possible to realize the karaoke performance with the optimum timbre setup. The size of the typical shape data is only several kilobytes so that a great memory capacity is not required. The timbre can be drastically changed with changing the type of the shape data in contrast to the conventional filtering method.

In operation of the second aspect of the invention, a multiple of types of the shape data are stored in the shape data memory. At the beginning of the karaoke performance, a desired type of the shape data is distributed to the physical model sound source separately from the song data. Thus, the physical model sound source can be driven to create a desired timbre specified by the shape data to provide the karaoke performance, even when the song data does not accommodate the shape data. The shape data to be reserved in the shape data memory can be downloaded, for example, from a central station through telecommunication. The size or volume of the typical shape data is only several kilobytes so that the downloading of the shape data can be executed very quickly. The shape data is distributed to set up the physical model sound source before generating the waveform of the musical sound. At this time, real-time processing is not required for handling the shape data since the karaoke performance is not yet commenced so that a slow storage device such as a hard disk is good enough for storing the shape data. Thus, the timbre setup of the karaoke apparatus can be updated through the on-line data transfer even if the karaoke apparatus is already installed at a certain location remote from the central station.

DETAILED DESCRIPTION OF PREFERRED EMBODIMENTS

Figure 1:
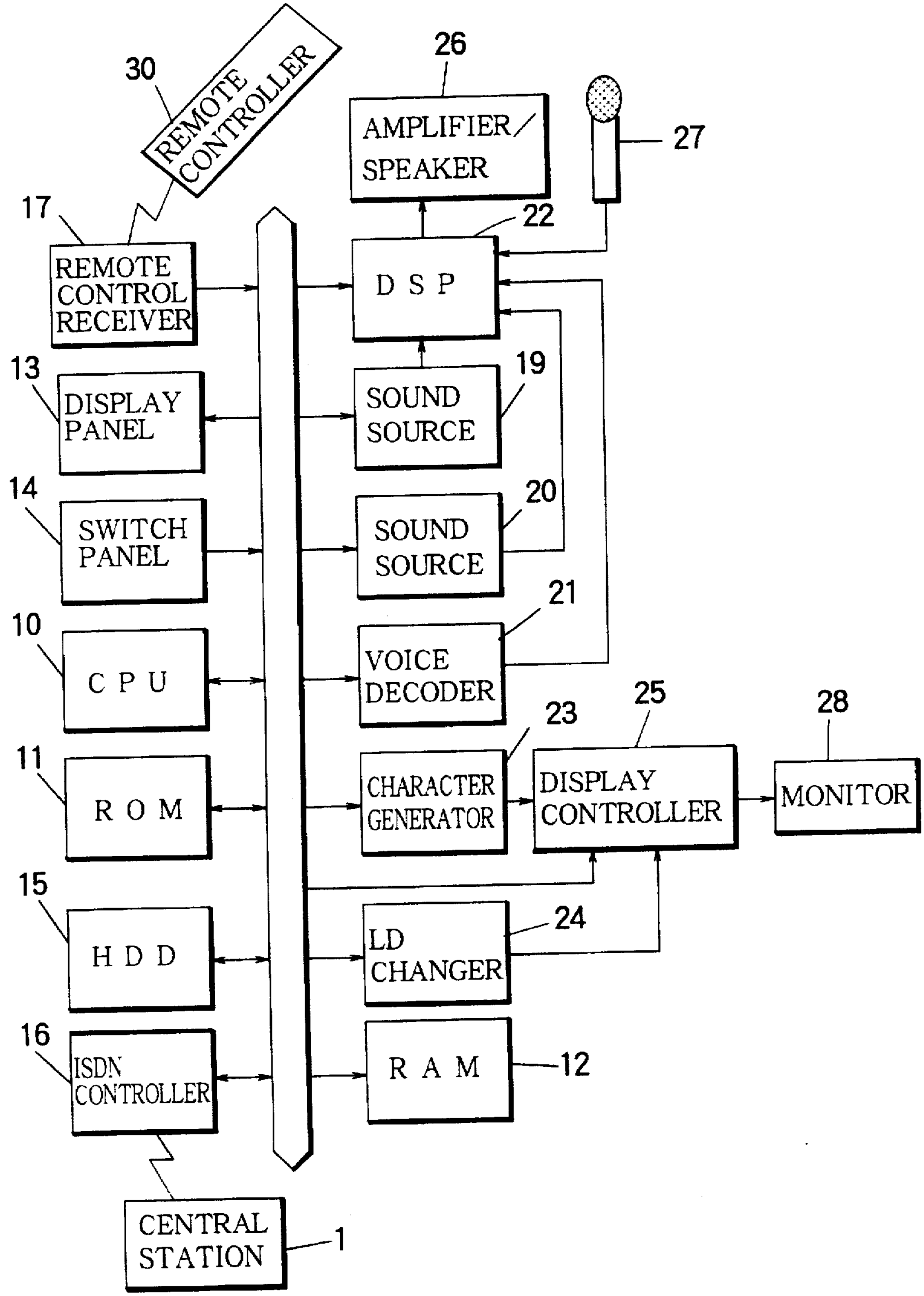
FIG. 1 is a schematic block diagram of the inventive karaoke apparatus.

Details of an embodiment of a karaoke apparatus according to the present invention will now be described with reference to the drawings. FIG. 1 is a schematic block diagram of the inventive karaoke apparatus. FIGS. 2, 3A–3C and 4 show a physical model sound source employed in the inventive karaoke apparatus. The karaoke apparatus is constructed in the form of so-called "network sound source" karaoke apparatus. In the "sound source" karaoke apparatus, song data is fed to a sound source device, which reproduces musical sound in order to provide karaoke performance. The karaoke apparatus accommodates a pair of sound sources, namely a PCM sound source and a physical model sound source (VOP sound source). The physical model sound source electrically simulates mechanism of sound production in a natural instrument such as wind instrument and stringed instrument. The sound source arithmetically synthesizes a waveform of sound based on shape data which characterizes the wind or stringed instrument to be simulated, and based on performance parameters which characterize playing style of the instrument. The volume of the shape data is about several kilo-bytes. With modifying the shape data, the physical model sound source creates a waveform of musical sound which is significantly different from an original waveform. The shape data is distributed to set up the physical model sound source before generating the waveform of the musical sound. Real-time processing is not required for handling the shape data so that a slow storage device such as a hard disk is good enough for storing the shape data.

The "network" karaoke apparatus is connected to a host or central station which downloads song data containing karaoke performance data via communication network to the karaoke apparatus. The downloaded song data is stored in a hard disk drive (HDD). The HDD has a memory capacity to store several thousands of song data.

Figure 2:
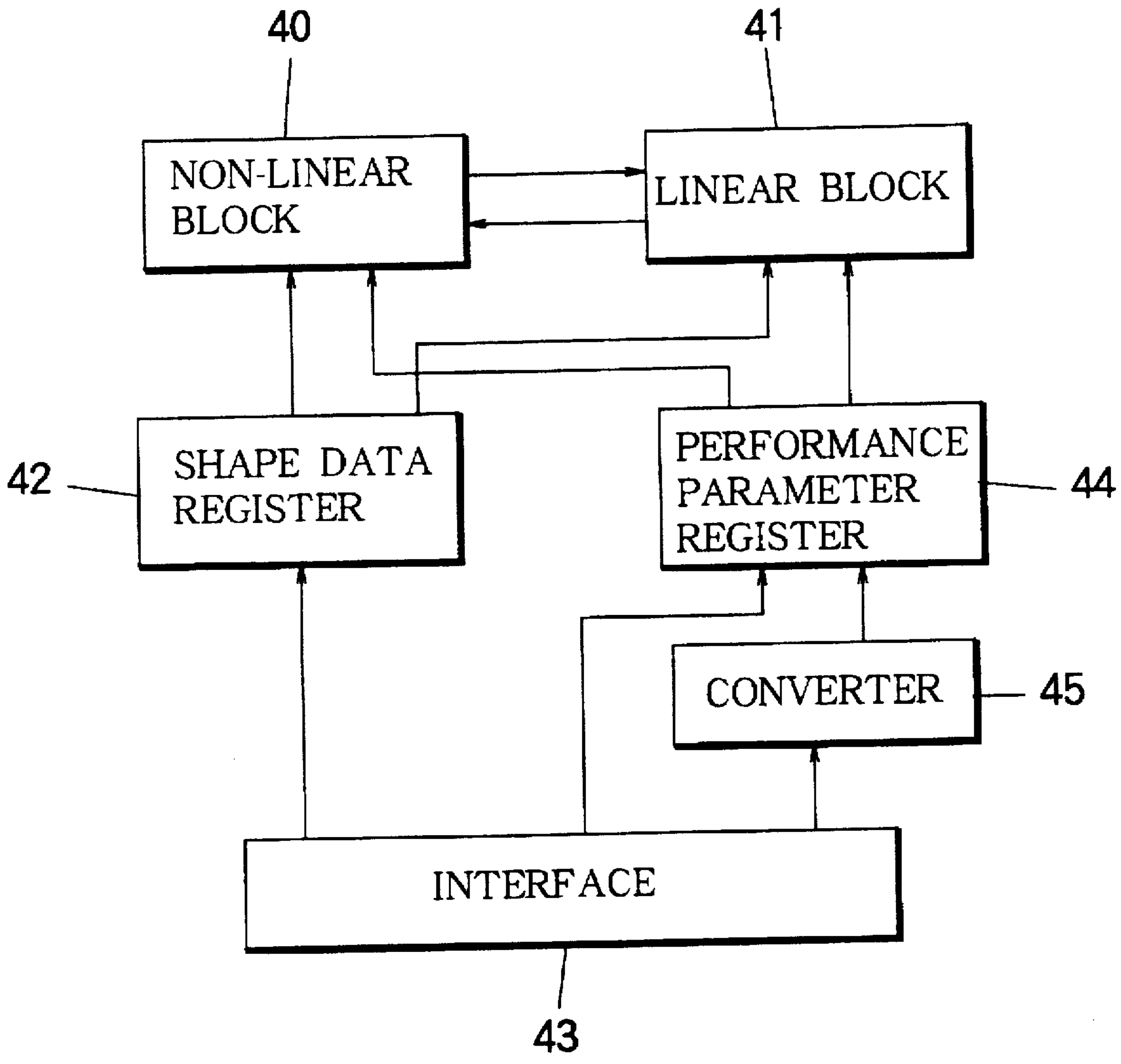
FIG. 2 illustrates structure of a physical model sound source employed in the karaoke apparatus.

The physical model sound source of the present embodiment will be described hereunder. FIG. 2 shows a schematic block diagram of the physical model sound source. The physical model sound source is comprised of a non-linear block 40 which inputs an excitation signal for exciting a vibration, and a linear block 41 which loops the vibration to set a resonant frequency. Further, the sound source is provided with an interface 43 to receive various signals, a converter 45, a shape data register 42, and a performance parameter register 44. In simulating a model wind instrument, the non-linear block 40 corresponds to a mouth piece of the instrument, while the linear block 41 corresponds to a tube of the instrument. In FIG. 2, the non-linear block 40 and the linear block 41 are connected to each other through two signal lines in forward and backward directions. A traveling waveform signal FD is transmitted through the forward line, while a reflected waveform signal FR is transmitted through the backward line. The non-linear block 40 is distributed with a non-linear table defining non-linear characteristics relative to the excitation signal, as well as shape parameters representing the shape of the mouth piece in the non-linear block 40. The linear block 41 is distributed with the shape parameters representing the shape such as a tube length of the wind instrument and a position of tone holes. The non-linear table and shape parameters are stored in the shape data register 42. The shape data register 42 works as a part of the shape data distributor in the present invention. Further, the performance parameters are distributed to the non-linear block 40 and the linear block 41 from the performance parameter register 44. In case of a single reed instrument such as saxophone, the non-linear block 40 is distributed with blowing pressure data PRES and embouchure (lip ligaturing) data EMBS as the performance parameters, while the linear block 41 is distributed with fingering pattern data FING as the performance parameters.

In the network karaoke apparatus, the song data containing the performance data is generally described in a MIDI format. When the physical model sound source is distributed with the MIDI data as the performance data, the MIDI data is fed to the converter 45. The converter 45 converts the input MIDI data into the performance parameters, and sends them to the performance parameter register 44. The conversion process is such that note-on key codes are translated into the fingering pattern data FING. On the other hand, if the song data has a specific format designed for the physical model sound source such that the performance data in the song data includes the performance parameters directly, the retrieved performance parameters are directly written into the performance parameter register 44 via the interface 43. If the performance data in the song data contains the performance parameters directly, delicate articulation is realized as in a real instrument.

Figure 3A:
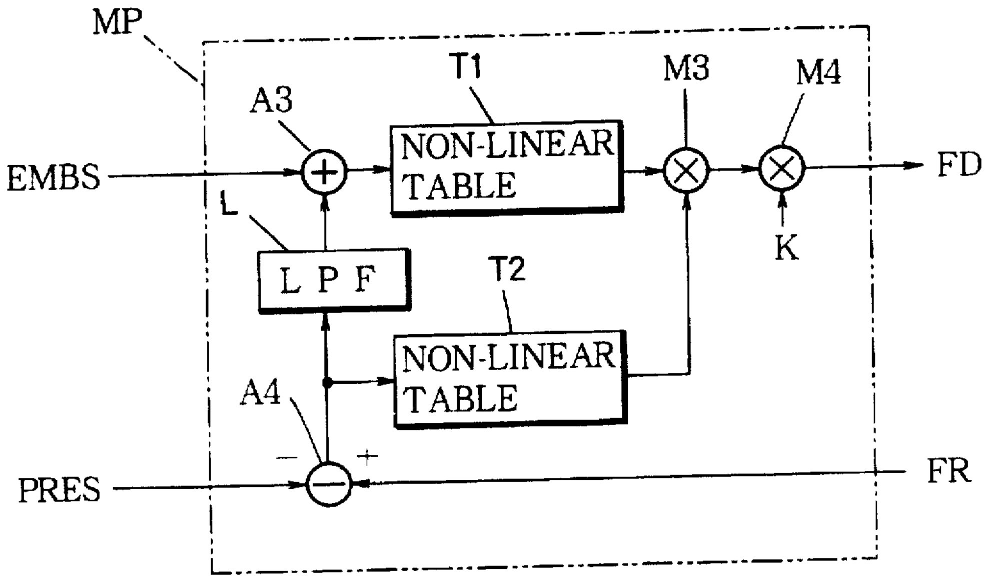
FIGS. 3A–3C illustrate structure of a non-linear block of the physical model sound source.
Figure 3B:
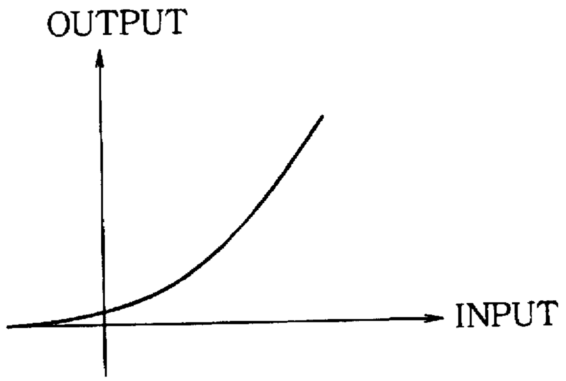
Figure 3C:
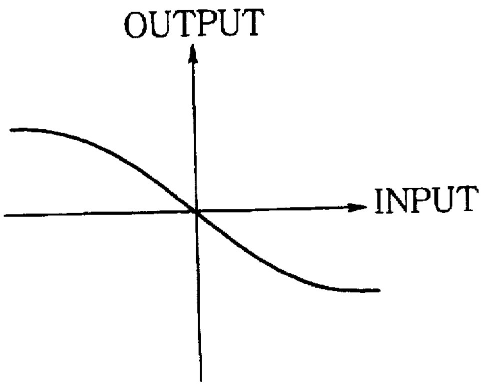

The non-linear block 40 excites the vibration signal according to the distributed parameters, and sends the vibration signal to the linear block 41. The linear block 41 internally resonates the transmitted vibration signal in order to generate a waveform signal of desired musical sound. The waveform signal of the musical sound is outputted from the other side of the linear block 41 opposite to the non-linear block 42. The physical model sound source simulating the wind instrument such as saxophone will be described in detail hereunder. FIG. 3A shows structure of the non-linear block simulating the air vibration generating mechanism in a single reed wind instrument such as saxophone. The pressure signal PRES is fed from the performance parameter register 44 to a subtracter A4. The subtracter A4 also receives the reflected waveform signal FR fed back from the linear block 41. The subtracter A4 subtracts the pressure signal PRES from the reflected waveform signal FR. The subtraction result is outputted as a pressure difference signal to control the transformation of the reed. The pressure difference signal is distributed to a lowpass filter L and to a non-linear table T2. The non-linear table T2 simulates the fact that the velocity of the air does not vary in proportion to the pressure difference even if the pressure difference increased, because the air flow saturates in a narrow air path such as the mouth piece of the wind instrument. The table T2 has an I/O characteristic curve as shown in FIG. 3C. The lowpass filter L cuts off high frequency components of the pressure difference signal since the reed of the woodwind instrument does not respond to a high frequency range. The output of the lowpass filter L is fed to an adder A3 which also receives the embouchure signal EMBS from the performance parameter register 44. A non-linear table T1 simulates transformation of the reed in response to a given pressure. The table T1 has an I/O characteristic curve shown in FIG. 3B. The output of the non-linear table T1 represents a sectional area of the air path at the tip end of the mouth piece. The output of the non-linear table T1 is fed to a multiplier M3. The multiplier M3 also receives the output of the non-linear table T2 representing a compensated pressure difference. Thus, the multiplier M3 multiplies the pressure difference and the area of the air path so that the velocity of the air flow is calculated. The output of the multiplier M3 is fed to a next multiplier M4. The multiplier M4 multiplies the velocity data with a coefficient k representing an impedance or air resistance. The resulted data is outputted as a sound pressure signal FD of a traveling waveform. The signal FD creates a vibrating waveform because the sound pressure may not increase linearly even if the blowing pressure PRES increases and the sound pressure decreases due to the saturation of the air flow velocity.

Figure 4:
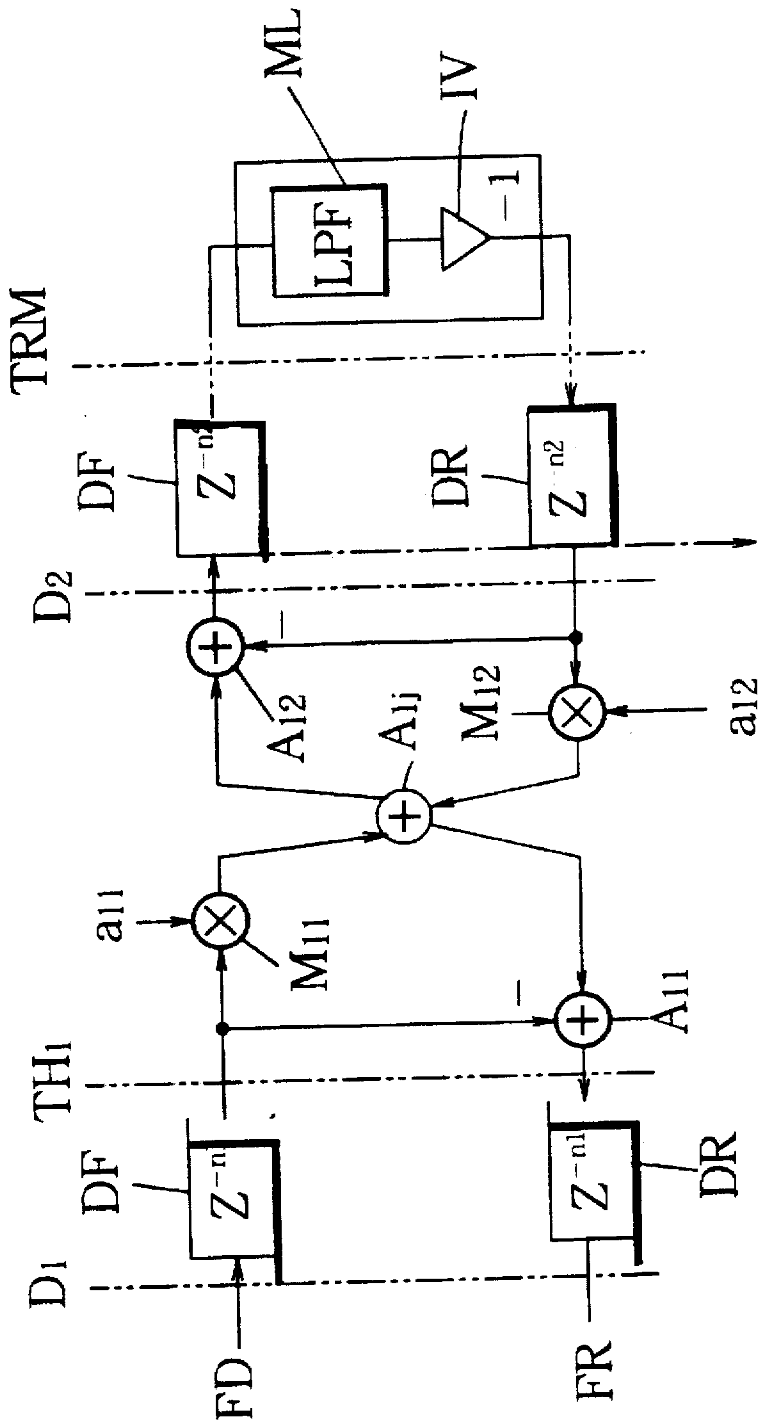
FIG. 4 illustrates structure of a linear block of the physical model sound source.

FIG. 4 shows structure of the linear block 41 to simulate resonance state of the air column in the tube of the woodwind instrument (columnar air mass in the tube). The linear block 41 is comprised of plural tone holes THn, plural tube sections Dn linking the tone holes, and an end of the tube TRM. Although only one tone hole (TH1), and two tube sections D1 and D2 are illustrated in FIG. 4, the actual instrument has 10 to 20 tone holes disposed at predetermined intervals so that the linear block 41 would have the tone holes of the same number interleaving with the tube sections in the actual implementation. The traveling forward wave FD is transmitted through the tube sections Dn while being diffused at the tone holes THn, to thereby reach the tube end TRM. Then, the signal is reflected back to the non-linear block 40 through the tube sections Dn while being diffused at the tone holes THn. Each tube section Dn is comprised of delays DFn and DRn to simulate a part of the tube body between the tone holes. More particularly, the delay time set in the delays DFn and DRn corresponds to a transmission time of the traveling wave FD and the reflected wave FR through the tube portion. The length of the tube portion is represented by the delay time. The tone holes THn simulate scattering of the pressure wave in the vicinity of the tone holes and simulates forcible node creation at the tone holes. Particularly, the shape of the tube is not uniform at the tone hole position so that the traveling wave PD and the reflected wave FR are disturbed to interfere each other. Further, if the tone hole is open, the sound pressure is released there, and a node is forcibly created at the tone hole. The interference is simulated by subtracters An1 and An2, and an adder Anj. The opening and closing operation of the tone holes is simulated by multipliers Mn1 and Mn2. Assuming that the diameter of the tone hole is $\phi_{n3}$, and the diameters of the top and bottom ends of the resonator tube are $\phi_{n1}$ and $\phi_{n2}$, the coefficients $\alpha_{n1}$ and $\alpha_{n2}$ distributed to the multipliers Mn1 and Mn2 can be described as follows in case that the tone hole is opened.

$$\alpha_{n1}=2\phi_{n1}^2/(\phi_{n1}^2+\phi_{n2}^2+\phi_{n3}^2)$$

$$\alpha_{n2}=2\phi_{n2}^2/(\phi_{n1}^2+\phi_{n2}^2+\phi_{n3}^2)$$

On the other hand, in case that the tone hole is closed, the coefficients $\alpha_{n1}$ and $\alpha_{n2}$ are determined as follows.

$$\alpha_{n1}=2\phi_{n1}^2/(\phi_{n1}^2+\phi_{n2}^2)$$

$$\alpha_{n2}=2\phi_{n2}^2/(\phi_{n1}^2+\phi_{n2}^2)$$

Either of the open and closed coefficients is selected in response to the fingering pattern parameter FING specifying the open or closed status of the tone hole. Details of the fingering pattern generation is disclosed in U.S. Pat. No. 5,371,317. The half-open status of the tone hole can be simulated by modifying the coefficient $\phi_{n3}$. At the tube end TRM, a lowpass filter ML simulates the attenuation of the high frequency range due to the reflection of the air vibration. An inverter IV simulates phase reverse by 180 degrees at the open end of the tube.

In the physical model sound source described above, the shape data includes the non-linear tables T1, T2 and the coefficient k distributed to the non-linear block 40, and the coefficients including DFn, DRn, $\phi_{n1}$, $\phi_{n2}$, $\phi_{n3}$ and cutoff frequency of the LPF provided in to the linear block 41. The shape data defines the physical shape of the instrument to be simulated. For example, with setting the cutoff frequency of the LPF high, a wide and shallow bell of a horn instrument can be simulated. On the other hand, with setting the cutoff frequency low, a deep bell of the horn can be simulated. Thus, it is possible to realize delicate variation of the timbre in the instrument having the fixed shape. The performance parameter data includes the embouchure signal EMBS, the pressure signal PRES, the fingering pattern parameter FING and so on. With modifying these parameters, it is possible to change not only the pitch or volume, but also the timbre of the sound drastically. Instead of the fingering pattern parameter FING, the coefficients $\alpha_{n1}$ and $\alpha_{n2}$ of the tone hole can be distributed directly to the physical model sound source as the performance parameter data. Other parameters which can be applied to the physical model sound source of the wind instrument type include vibrato parameter, tonguing parameter, amplitude parameter, 'scream' parameter (parameter controlling wild effect of changing timbre), breath noise parameter (parameter controlling a sound of leaking breath), 'growl' parameter (parameter controlling periodic change in volume and timbre), throat formant parameter (parameter controlling pitch and timbre caused by a throat of a player), dynamic filter control parameter, harmonics enhancer parameter (harmonics controlling parameter), dumping parameter (energy attenuation controlling parameter), absorption parameter (parameter controlling attenuation caused by transmission in the air) and so on. The similar parameters are applied in another physical model sound source of the stringed instrument type in order to control the musical sound.

The whole structure of the karaoke apparatus will be described hereunder with reference to FIG. 1. A CPU 10 is connected through a system bus to a ROM 11, a RAM 12, an HDD 15, an ISDN controller 16, a remote control receiver 17, a display panel 13, a switch panel 14, sound sources 19 and 20 of different types, a voice decoder 21, a DSP 22, a character generator 23, an LD changer 24, and a display controller 25. The ROM 11 stores a system program, a loader program, application programs, font data and so on. The fundamental operation of the karaoke apparatus and the operation of the peripheral devices are controlled according to the system program. The loader program is utilized to download the song data and the preset shape data from a central station 1. Peripheral device controlling program and sequence program are stored as the application program. The sequence program includes a main sequence program, a sound sequence program, a character sequence program, a voice sequence program, and a DSP controlling sequence program. In the karaoke performance, each sequence program is executed by the CPU 10 in parallel manner so that parallel tracks of the song data are read out according to each corresponding sequence program in order to execute the process handling the musical sound generation, the video image reproduction and so on. The font data is utilized to display lyric words and title of a requested song. Various font sets including 'Mincho', 'Gothic' and so on are stored as the font data. The RAM 12 is allocated with work areas including an executive data area for storing the song data of the requested karaoke song to be performed. In the executive data area, the song data is loaded in advance from the HDD 15 at the time of karaoke performance.

Figure 5A:
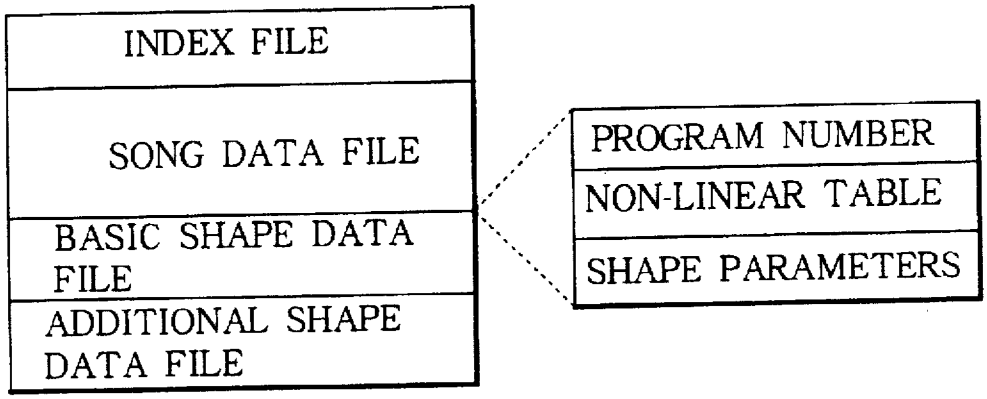
FIGS. 5A–5C illustrate a data format in a hard disk provided in the karaoke apparatus.

The HDD 15 stores an index file, a song data file, a basic shape data file, and an additional shape data file as shown in FIG. 5A. Several thousands of song titles or items are stored in the song data file. Each item of the song data is identified by a song code. The basic shape data file contains a multiple of types of shape data selectively distributed to the physical model sound source 19. The basic shape data represents a regular musical instrument used in general purpose. The basic shape data may be implemented in conforming with GM (General MIDI) standard in order to select an instrument program specified by program numbers 1 to 128. The additional shape data file may be implemented to store specific types of the shape data other than the general or basic shape data conforming the GM standard. The specific shape data is identified by program numbers except 1 to 128. The index file stores a song code and a data address of each song data in corresponding manner.

Referring back to FIG. 1, the communication between the karaoke apparatus and the central station 1 is carried out through the ISDN controller 16. The song data and the shape data are download from the central station 1. The ISDN controller 16 has a built-in DMA controller which writes the download data into the HDD 15 without the control of the CPU 10. The central station 1 is located remotely from each terminal of the karaoke apparatus for serving the data under centralized management of a database. The central station 1 transmits or downloads the shape data together with the song data, or downloads the shape data separately from the song data.

The remote control receiver 17 receives an infrared signal transmitted by a remote controller 30. The remote controller 30 is provided with ten-key switches, command switches such as a song selector switch. The remote controller 30 transmits the infrared signal modulated with codes corresponding to the user's operation of the switches. The display panel 13 is provided on a front face of the apparatus to display the song code, a number of the reserved song items and so on. The switch panel 14 is provided on a part of a front operation panel of the apparatus, and includes a song code input switch, a singing key changing switch and so on.

The sound sources 19 and 20 generate the instrumental accompaniment sound according to the performance data read out from the tracks of the song data. The sound source 19 is structured as a physical model sound source, while the other sound source 20 is a conventional PCM sound source. The selection of these sound sources is controlled depending on the type of the song data, or depending on selecting operation of the user of the karaoke apparatus. The voice decoder 21 receives ADPCM digitized voice data and decodes the same into a back chorus voice signal. The digital instrumental accompaniment sound signal generated by either of the sound source 19 and 20 is fed to the DSP 22 concurrently with the voice signal generated by the voice decoder 21. The DSP 22 is connected to a microphone 27. The DSP 22 adds an acoustic effect such as echo and reverb to the instrumental accompaniment sound signal and the back chorus and live singing voice signals inputted from those of the sound sources 19 and 20, the voice decoder 21 and the microphone 27. The type and depth of the sound effect added by the effector DSP 22 is controlled based on DSP control data included in the song data. The effect-added instrumental accompaniment sound signals and the chorus and singing voice signals are mixed with each other, and are then converted into an analog signal, which is then inputted into an amplifier/speaker 26. The amplifier/speaker 26 reproduces the analog audio signal with amplification.

The character generator 23 generates character patterns representative of a song title and lyrics in response to character data contained in the song data. The LD changer 24 accommodates about five laser discs, and can reproduce approximately 120 scenes of background video images. The background video image to be displayed is selected in response to chapter number data contained in the song data. The character patterns generated by the character generator 23 and the background video image generated by the LD changer 24 are fed to the display controller 25. The display controller 25 superposes the inputted image data and the character data with each other and send the superposed data to a monitor 28.

Figure 5B:
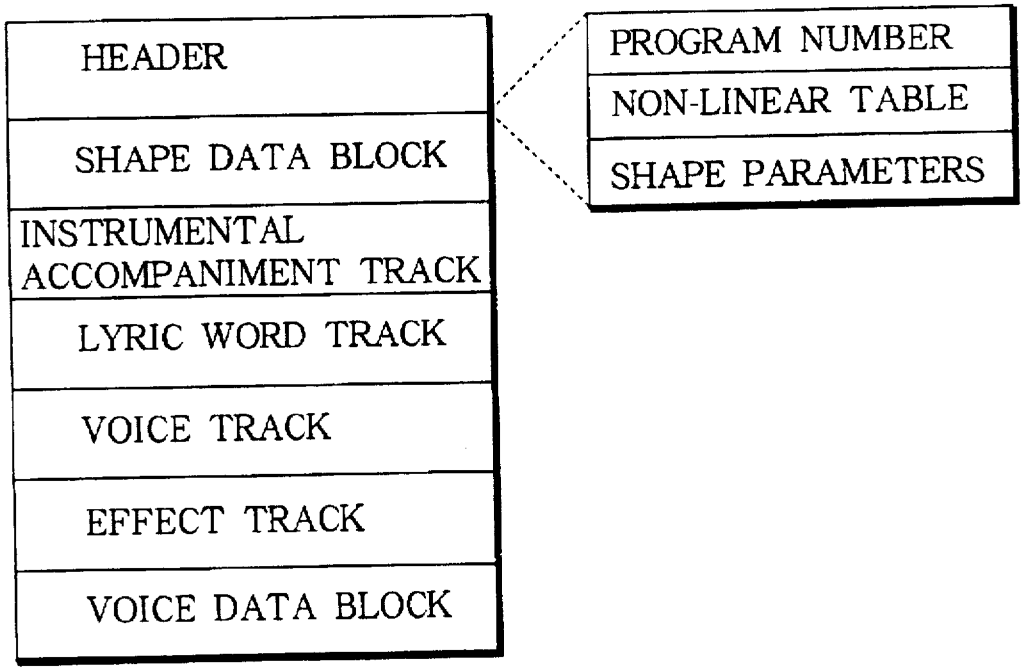

FIG. 5B illustrates a format of one item of the song data for the physical model sound source. In FIG. 5B, the song data is comprised of a header, a shape data block, an instrumental accompaniment track, a lyric word track, a voice track, an effect track, and a voice data block. The header contains various data relevant to a karaoke song such as the song code, the title of the song, the genre of the song, the sound source designating data, the release date of the song, the performance time of the song and so on. The genre data can be utilized to select the background video image. For example, a video image of a snowy country is chosen as the background video image if the genre data indicates that the karaoke song is an ENKA song in winter season. Otherwise, a video image of foreign scenery is selected if the genre data indicates that the karaoke song is a foreign pop song. The sound source designating data indicates whether the song data is fed to the physical model sound source or fed to the PCM sound source.

The shape data block stores one type of the shape data to determine the timbre of instrumental accompaniment used in the karaoke performance of the song. The shape data used for the instrumental accompaniment generation is transferred to the shape data register of the sound source. The shape data block may store every types of the shape data for all of the timbres involved in the accompaniment. Otherwise, the basic shape data corresponding to the program numbers 1 to 128 may be excluded from the shape data block, and the basic shape data is read out directly from the basic shape data file. In this embodiment, the basic shape data file is searched for the general timbres having program numbers 1 to 128, while the shape data block is searched for the rest of the specific timbres having program numbers other than 1 to 128.

Figure 5C:
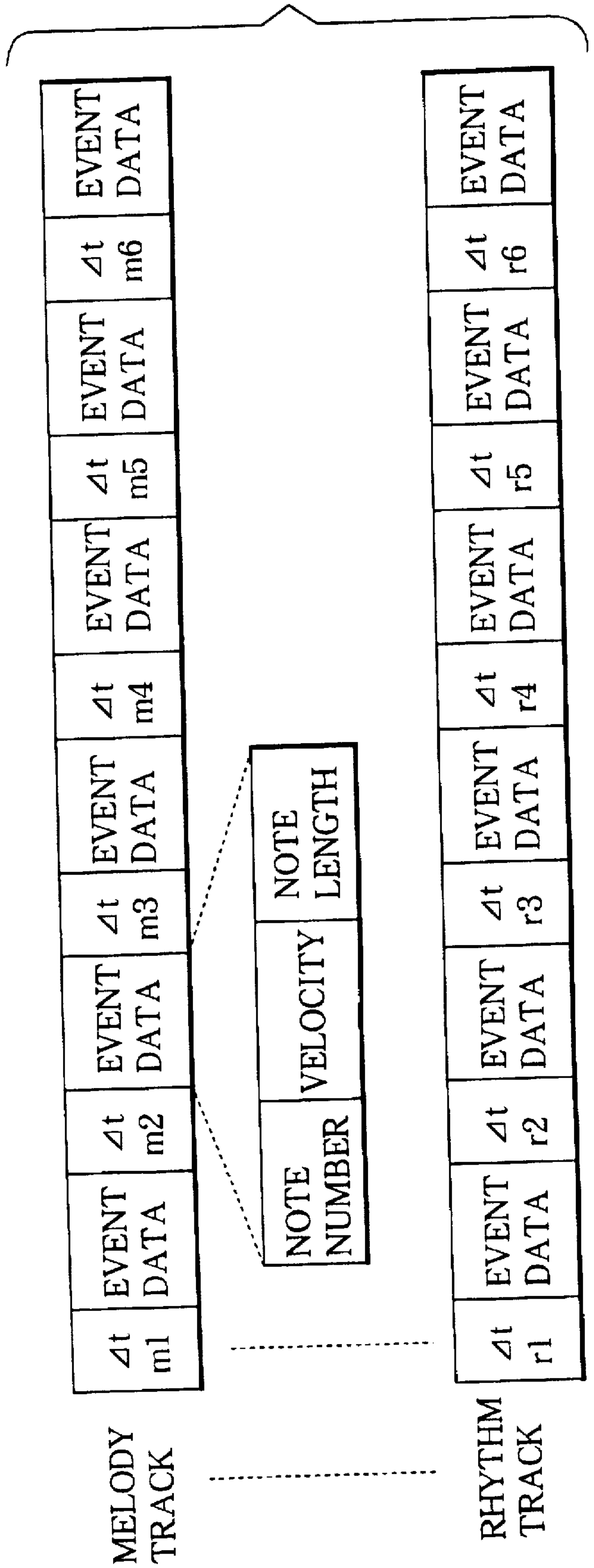

As shown in FIG. 5C, the instrumental accompaniment track is comprised of parallel sub-tracks such as a melody track, various instrumental tracks, rhythm track and so on. Each sub-track is composed of event data and duration data Δt specifying an interval of each event data. If the event data is read out from the track in automatic performance, the CPU 10 sends the event data to the sound source 19 or 20. If the duration data is read out, the duration is counted down in synchronism with the tempo of the song, and next event data is read out when the count value reaches zero. The event data in the instrumental accompaniment track represents the performance data of the present invention. Generally, the event data in the instrumental accompaniment track is prescribed in the MIDI data format. However, in case that the performance data of a specific format is provided for the physical model sound source, the performance parameter is written as event data in the accompaniment track with assigning the event data to the control change data. Rare events generated occasionally may be written as system exclusive data. The physical model sound source is driven directly by the performance parameters to enable more artistic representation than driving the sound source by generic MIDI data through conversion. Further, the PCM sound source having a function to convert the performance parameter to the generic MIDI data is additionally provided so that the PCM sound source can generate the musical sound even when the specific performance data for the physical model sound source is inputted.

Referring back to FIG. 5B, the lyric word track records sequence data to display lyrics on the video monitor 28. The sequence data is comprised of lyric display data (event data) and the duration data which indicates the interval of the event data in time series. The data written in the lyric word track is not the instrumental accompaniment data, but this track, as well as the voice track and the effect track, is described also in the MIDI data format to enable easy production by integrating the implementation. The lyric display data comprises character codes for displaying a line of the lyric phrase and wipe sequence data. The wipe sequence data is read out to change color of the displayed lyric words in synchronism with the progression of the karaoke song. The voice track is a sequence track to record human voices hard to synthesize by the sound source 19 or 20 such as backing chorus and harmony voices. The voice data contains the event data to control generation timing of the ADPCM data stored in the voice data block and the duration data. The effect track records the event and duration data to control the DSP 22. In this case, the event data indicates the type and depth of the sound effect to be added to the musical sound.

Figure 6:
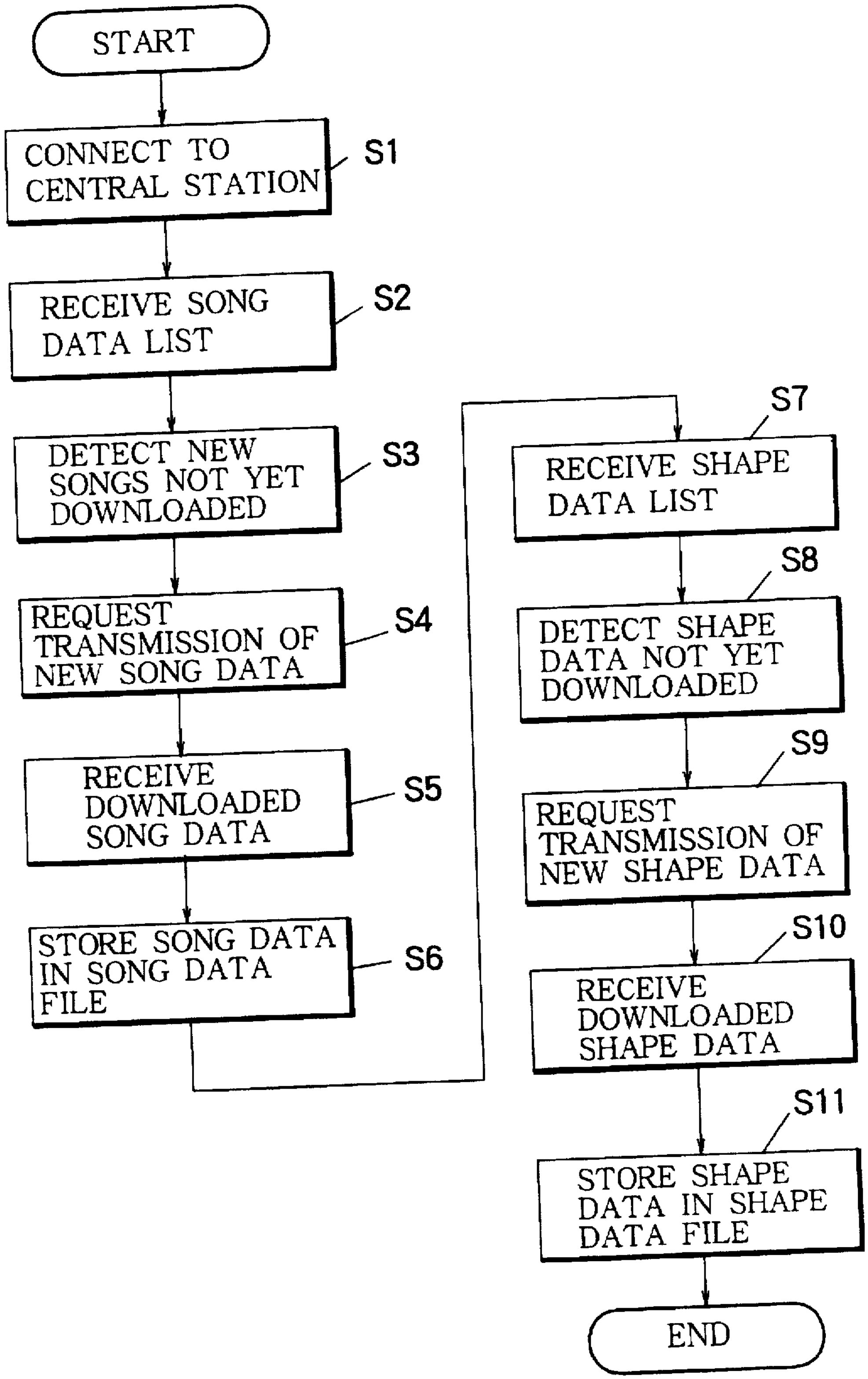
FIG. 6 is a flowchart illustrating data downloading process in the karaoke apparatus.

FIG. 6 is a flowchart illustrating the downloading process of the song data and shape data from the central station. The karaoke apparatus connects to the central station periodically. The central station holds the huge database of the song data and the shape data, which are always updated for registering new items of the song data and new types of the shape data for the maintenance of the database. When the karaoke apparatus connects to the central station (step s1), the song data list is received (step s2). The received song data list is compared with the old items of the song data stored in the HDD 15 to recognize new items of the song data which are not downloaded yet (step s3). The song code of the recognized song data to be downloaded is sent to the central station to request the transmission of the new song data (step s4). The central station transmits the requested song data to the karaoke apparatus in response to the request (step s5). The karaoke apparatus receives the song data and stores it in the song data file in the HDD 15 (step s6).

Then, the shape data list is received from the central station (step s7). The received shape data list is compared with the shape data list reserved in the HDD 15 in order to recognize new types of the shape data which are not downloaded yet (step s8). The identification code of the recognized shape data is sent to the central station to request downloading of the new types of the shape data (step s9). The central station transmits the new shape data to the karaoke apparatus in response to the request (step s10). The karaoke apparatus receives the shape data and stores it in the shape data file in the HDD 15 (step s11). The basic or typical shape data having the data code (program number) 1 to 128 is stored in the basic shape data file, while the additional shape data with the data code other than 1 to 128 is stored in the additional shape data file.

Figure 7:
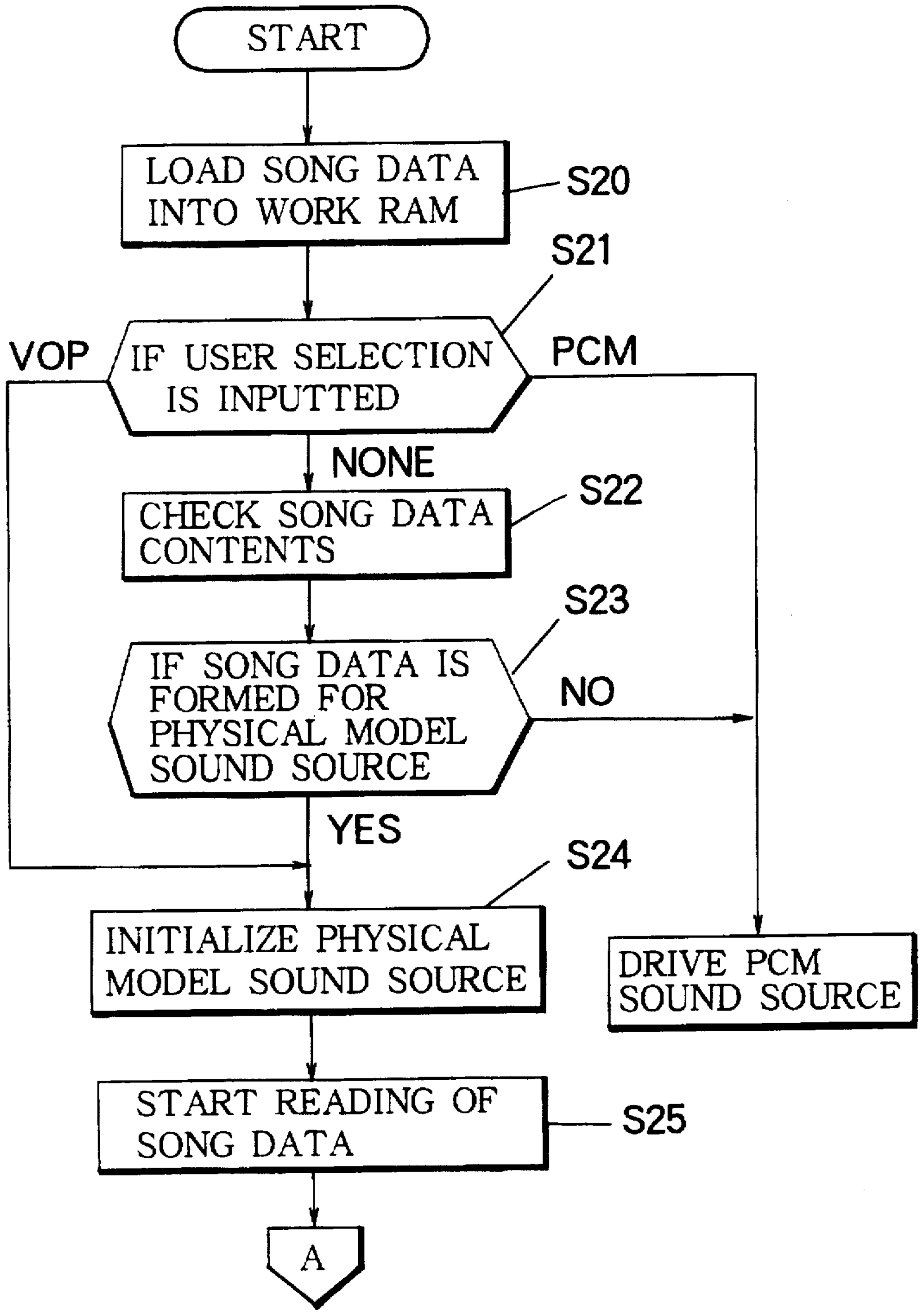
FIG. 7 is a flowchart illustrating operation of the karaoke apparatus in karaoke performance.
Figure 8:
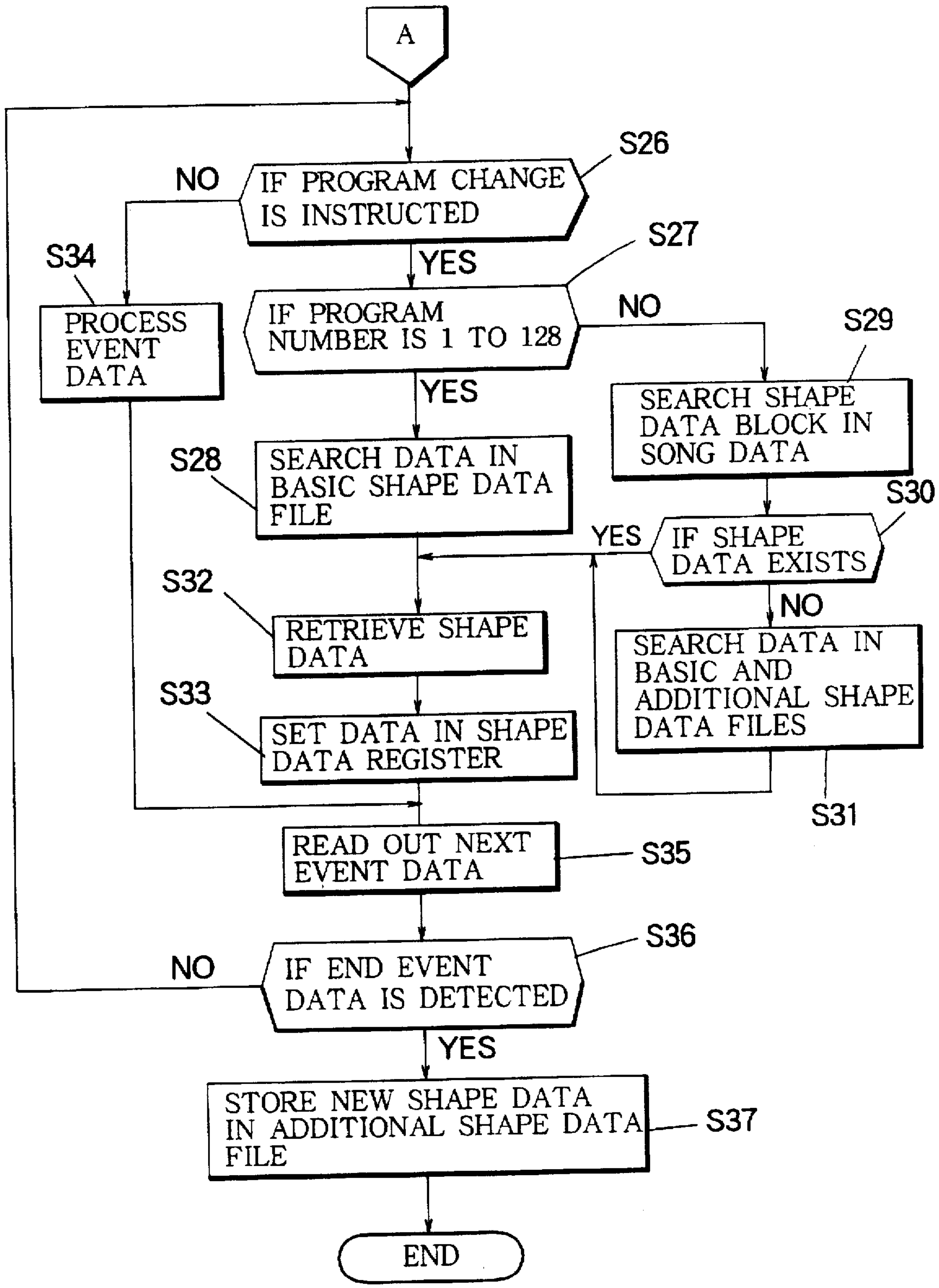
FIG. 8 is a flowchart illustrating operation of the karaoke apparatus in the karaoke performance.

FIGS. 7 and 8 are a flowchart showing the operation of the karaoke apparatus in the karaoke performance. When the user inputs a song code, the requested song data corresponding to the song code is read out from the HDD 15 and loaded into the executive data area in the RAM 12 (step s20). Then, the sound source selecting operation of the user is detected (step s21). The sound source selecting operation is carried out by operating the sound source selecting switch equipped on the switch panel 14 or the remote controller 30. If the physical model sound source (VOP) is selected, the procedure goes forward to step s24. Otherwise, the procedure advances to execute karaoke performance using the PCM sound source if the PCM sound source is selected. If the sound source selecting operation is not executed, the contents of the song data are examined in step s22. If the song data is formed for the physical model sound source, the karaoke performance is executed with the physical model sound source (steps s23 and s24). The song data is discriminated for the physical model sound source, if the song data contains the shape data or if the header of the song data indicates that this song data should be played with the physical model sound source. If the song data is not the one formed for the physical model sound source, the karaoke performance is executed with the PCM sound source 20.

In the karaoke performance with the physical model sound source, the physical model sound source 19 is initialized (step s24). Then, reading of the song data is initiated (step s25). If the read event data is the program change (step s26), the shape data is set to the physical model sound source. In setting of the shape data, it is tested whether the program number of the shape data is in the range of 1 to 128 so that the shape data is the basic one (step s27). If the shape data is the basic one, the basic shape data file is searched in step s28 in order to retrieve the relevant shape data (step s32). The retrieved shape data is sent to the physical model sound source, in which the data is set to the shape data register 42 (step s33). When the program number is found other than the range of 1 to 128, the shape data block of the song data is searched (step s29) and the relevant shape data is read out (steps s30 to s32), if it exists. When the relevant shape data is not found in the shape data block, the additional shape data file and the basic shape data file are searched in the HDD 15 to find exact or similar shape data (step s31). The identity or similarity of the shape data can be recognized in terms of the type of the instrument or a sound generating method as remarked in the shape data itself. The size or volume of the ordinary shape data is only several kilobytes so that the reading and loading of the shape data can be executed very quickly.

When the read event data is not the program change data, relevant procedures to the event data is executed (step s34). Then, next event data is read out (step s35). If the read event data is not end event data, the procedure returns from step s36 to step s20 to execute the same routine repeatedly. If the end event data is detected, the karaoke performance is terminated. After the performance termination, if new shape data which is not stored in the additional shape data file is found in the song data, the new shape data is written in the additional shape data file (step s37).

In the embodiment described above, the physical model sound source is formed of the wind instrument type. However, the type of the physical model sound source is not limited to that, and the stringed instrument type or percussion instrument type of the physical model sound source can be utilized as well. A physical model sound source having no corresponding natural instrument can be implemented if desired. One of the physical model sound source and the PCM sound source is exclusively selected in the embodiment above. However, both of the sound sources can be used simultaneously while allocating some part to one sound source and allocating remaining part to another sound source. In this implementation, the physical model sound source can be used for playing a part including the shape data, while the PCM sound source is used for playing another part precluding the shape data. Further in this implementation, the sound source selection may be accepted a part by part of the song data in the processing shown in FIG. 7. For example, it is possible to prompt the selection by discriminating a part which can be played by the physical model sound source from another part which can be played by the PCM sound source.

According to the first aspect of the invention, in the karaoke apparatus responsive to a request for producing a karaoke accompaniment according to performance data, the sound source 19 of the physical model type is controlled according to shape data which characterizes an acoustic vibration of a model musical instrument for electrically simulating the acoustic vibration to synthesize a tone waveform as if created by the model musical instrument. The sound source 19 is driven according to performance data for sequentially processing the tone waveform to produce the karaoke accompaniment. The distributor 42 is settable with the shape data for feeding the sound source 19 with the set shape data. The memory (HDD 15) stores a plurality of items of performance data and a plurality of types of shape data in correspondence with each other. The driver (CPU 10) is responsive to the request for retrieving from the memory a requested item of the performance data to sequentially feed the same to the sound source 19 to thereby commence the karaoke accompaniment. The driver (CPU 10) operates before the karaoke accompaniment is commenced for retrieving from the memory a corresponding type of the shape data to set the same into the distributor 42 so that the sound source 19 can be fed with a pair of the requested item of the performance data and the corresponding type of the shape data. The downloader (central station 1) downloads new types of the shape data into the memory (HDD 15) to update a file containing a plurality of old types of the shape data. The downloader downloads a data set containing a corresponding pair of one item of the performance data and one type of the shape data. The driver (CPU 10) retrieves the corresponding type of the shape data which is designated by an identification code contained in the requested item of the performance data. The driver operates when the memory does not store the corresponding type of the shape data for retrieving a similar type of the shape data which substitutes for the corresponding type of the shape data. The additional sound source 20 of the pulse code modulation type operates free from the shape data to synthesize a tone waveform. The driver (CPU 10) operates when the corresponding type of the shape data is not available for feeding the requested item of the performance data to the additional sound source 20 to commence the karaoke accompaniment without the corresponding type of the shape data. By such a manner, the karaoke apparatus can create the karaoke accompaniment having the optimal timbre in matching with the performance data, thereby enriching the karaoke performance. The shape data may be readily downloaded since the shape data has a small volume.

According to the second aspect of the invention, in the karaoke apparatus responsive to a request for producing a karaoke accompaniment according to performance data, the sound source 19 of the physical model type is controlled according to shape data which characterizes an acoustic vibration of a model musical instrument for electrically simulating the acoustic vibration to synthesize a tone waveform as if created by the model musical instrument. The sound source 19 is driven according to the performance data for sequentially processing the tone waveform to produce the karaoke accompaniment. The memory in the form of HDD 15 rewriteably stores a file of a plurality of the shape data. The downloader in the form of the central station 1 downloads new ones of the shape data into the memory so as to update the file. The distributor retrieves a desired one of the shape data from the updated file in matching with the performance data and feeds the retrieved one of the shape data to the sound source 19 to thereby control the same. By such a manner, the karaoke apparatus can create karaoke performance having good timbre since the shape data is stored in the apparatus even if the song data does not contain the shape data. The song data file is updated by on-line data transfer so that the karaoke apparatus can be freely extended to a variety of timbres.

What is claimed is:

1. A karaoke apparatus responsive to a request for producing a karaoke accompaniment according to performance data, comprising:

a sound source of a physical model type that is controlled according to shape data which characterizes an acoustic vibration of a model musical instrument for electrically simulating the acoustic vibration to synthesize a tone waveform as if created by the model musical instrument, and that is driven according to performance data for sequentially processing the tone waveform to produce the karaoke accompaniment;

a distributor that is settable with the shape data for feeding the sound source with the set shape data;

a memory that stores a plurality of items of performance data and a plurality of types of shape data in correspondence with each other; and a driver that is responsive to the request for retrieving from the memory a requested item of the performance data to sequentially feed the same to the sound source to thereby commence the karaoke accompaniment, and that operates before the karaoke accompaniment is commenced for retrieving from the memory a corresponding type of the shape data to set the same into the distributor so that the sound source can be fed with a pair of the requested item of the performance data and the corresponding type of the shape data.

2. A karaoke apparatus according to claim 1, further comprising a downloader that downloads new types of the shape data into the memory to update a file containing a plurality of old types of the shape data.

3. A karaoke apparatus according to claim 2, wherein the downloader includes means for downloading a data set containing a corresponding pair of one item of the performance data and one type of the shape data.

4. A karaoke apparatus according to claim 1, wherein the driver comprises means for retrieving the corresponding type of the shape data which is designated by an identification code contained in the requested item of the performance data.

5. A karaoke apparatus according to claim 1, wherein the driver includes means operative when the memory does not store the corresponding type of the shape data for retrieving a similar type of the shape data which substitutes for the corresponding type of the shape data.

6. A karaoke apparatus according to claim 1, further comprising an additional sound source of a pulse code modulation type which operates free from the shape data to synthesize a tone waveform, and wherein the driver includes means operative when the corresponding type of the shape data is not available for feeding the requested item of the performance data to the additional sound source to commence the karaoke accompaniment without the corresponding type of the shape data.

7. A karaoke apparatus responsive to a request for producing a karaoke accompaniment according to performance data, comprising:

a sound source of a physical model type that is controlled according to shape data which characterizes an acoustic vibration of a model musical instrument for electrically simulating the acoustic vibration to synthesize a tone waveform as if created by the model musical instrument, and that is driven according to the performance data for sequentially processing the tone waveform to produce the karaoke accompaniment;

a memory that rewriteably stores a file of a plurality of the shape data;

a downloader that downloads new ones of the shape data into the memory so as to update the file; and a distributor that retrieves a desired one of the shape data from the updated file in matching with the performance data and that feeds the retrieved one of the shape data to the sound source to thereby control the same.

* * * * *